United States Patent [19]

Masuda

[11] 3,769,168

[45] Oct. 30, 1973

[54] PROCESS FOR THE PURIFICATION OF AMYLASES

[75] Inventor: Kazuo Masuda, Okayama, Japan

[73] Assignee: Hayashibara Company, Okayama, Japan

[22] Filed: June 11, 1971

[21] Appl. No.: 152,415

[30] Foreign Application Priority Data
June 17, 1970 Japan.......................... 45/52657

[52] U.S. Cl............................................. 195/66 R
[51] Int. Cl............................................. C07g 7/02
[58] Field of Search ..................... 195/7, 31, 17, 62, 195/66

[56] References Cited
UNITED STATES PATENTS
2,717,852 9/1955 Stone.................................. 195/17

OTHER PUBLICATIONS

Dixon et al., "Enzymes" p. 41–43, published by Academic Press, 2nd ed., 1964.

McLaren, A. D. J. Phys. Chem. Vol. 58, p. 129–137, 1954.

Primary Examiner—Lionel M. Shapiro

[57] ABSTRACT

The present procedure concerns a process for the purification of beta-amylases comprising treating a crude beta-amylase solution derived from wheat bran, soy bean or fresh sweet potato with an adsorbent such as bentonite, acidic clay, kaolinite and activated clay at a pH lower than 5.0 to adsorb the beta-amylases, washing out the adsorbent with water, and then eluting the adsorbed beta-amylases with a solution with an ionic strength over $0.5\mu$ and a pH exceeding 5.0.

6 Claims, No Drawings

PROCESS FOR THE PURIFICATION OF AMYLASES

DETAILED DESCRIPTION OF THE INVENTION

The present invention relates to a process characteristic in the purification of enzymes, comprising treatment of crude beta-amylase solution derived from wheat bran, soy beans or sweet potato with adsorbents, such as kaolinite, activated clay, acidic clay, bentonite, and the like, to adsorb the enzymes, separation of the enzymes and subsequent elution of the separated enzymes.

The production of pure beta-amylase is of an indispensable importance for the industrial production of pure maltose or maltose syrups. However, a process for the production of pure beta-amylase is hardly known except those for experimental applications. Known sources for beta-amylases are primarily of botanical sources which include wheat bran, soy beans, sweet potato, etc.

The only reported processes for the extraction and purification of beta-amylases derived from botanical sources are (1) the process described by Th. Sabalitschka, and R. Weidlich Biochem. Z. 211 229-38(1929), (2) Oskar Holmbergh; Arkivkemi, Mineral Geol. 11B. No. 6pp(1932), and (3) Arnoldk. Balls. Mayo, K. Walden, U.S. Pat. No. 2,496,261, Feb. 7, 1950. According to the process (1) the beta-amylase is absorbed from a malt extract solution using kao-linite at pH 4.5 and then eluted with a phosphate buffer (pH 7:6). However the process results in an enzyme recovery rate of slightly over 50 percent. In (2) is described a process comprising preparation of a 50 percent alcohol solution with an enzyme extract solution derived from barley malt, absorption and separation of the beta-amylases using starch, and washing in order to separate the alpha-amylases from the resultant product. The process described in (3) comprises treating of the beta-amylases with $Pb(ACO)_2$, salting out with $(NH_4)_2SO_4$, dialyzing with water to remove the sulfates and to lower the pH, and then removing the impurities. Process (1) results in a lower yield, whereas process (2) requires a large amount of alcohol and in process (3) a large consumption of $(NH_4)_2SO_4$ is required. Therefore the three processes are not regarded as preferred methods for the purification of enzymes on an industrial scale.

The inventors investigated various methods applicable for industrial use for the absorption and purification of crude enzyme solutions extracted from enzymatic sources abundant with enzymes, such as sweet potatoes, soy beans and wheat bran, using adsorbents. The adsorbents investigated in the detailed studies on the conditions of adsorption and elution were kaolinite or clays of activated clay and acidic clay. These investigations resulted in the findings that purification of enzymes was attainable with a recovery rate of nearly 100 percent by adsorbing the enzymes at lower than pH 5.0 and then eluting the resultant product using a buffer with a pH higher than 5.0 and an ionic strength of over $\mu = 0.5$.

Especially in the case of enzymatic solution extracted from sweet potatoes using activated clay a high absorption amount of 4,000-5,000 units per gram of adsorbent was obtained and 100 percent elution using a buffer with an ionic strength of over $\mu = 0.5$ at pH 5.0 was found possible, which led to the completion of the present invention.

The invention will now be described in detail.

The enzymatic sources used were rasped (extract) solution of raw sweet potato, wheat bran extract solution and solution extracted from soy bean flour defatted at low temperature with water. Such extract solutions do not contain other varieties of amylases and thus are advantageous enzymatic sources for industrial practice. In order to study the pHs of the solutions to be employed in adsorption and elution, determination of the pH stabilities were carried out. As regards beta-amylases of sweet potato the residual activities were determined after allowing standing 3 U/ml of enzymatic solution (containing M/20 of acetate buffer solutions of various pHs at 10°-15°C for 16-20(hours). At pH 3 the enzyme solutions were inactivated completely whereas no inactivation was observed at pH 4-11, establishing the fact that enzymes were stable within such pH range.

The following results were obtained by comparisons of the adsorption amount at pH 5.0 and the elution amount with water. The results are shown in Table I.

TABLE I. Adsorption of amylases derived from sweet potato

| Adsorbent | Units of amylases present in the adsorbed amount per gram adsorbent | The amount of enzymes eluted with water Wash liquor | | |
|---|---|---|---|---|
| | | I | II | III |
| Bentonite | 4860 | 0 | 0 | 0 |
| Acidic clay | 4860 | 0 | 0 | 0 |
| Kaolinite | 4310 | 130 | 30 | 0 |
| Activated clay | 4850 | 1570 | 30 | 0 |

At pH 5.0 each amount of adsorption was extremely large, while on the other hand there was hardly any elution with water.

The results of comparison tests on the amounts of elution at different pHs are listed in Table II.

TABLE II. Variations of Elutions Depending on Variations of pHs

| Elution pH | Amount of enzymes eluted with bentonite | Amount of enzymes eluted with acidic clay |
|---|---|---|
| 3.0 | 0 | 72 |
| 4.0 | 0 | 154 |
| 5.0 | 0 | 331 |
| 6.0 | 377 | 484 |
| 7.0 | 725 | 600 |
| 8.0 | 803 | 598 |
| 9.0 | 737 | 639 |
| 10.0 | 648 | 521 |
| 11.0 | 375 | 336 |
| 12.0 | 101 | 268 |

Notes: 16 hours' elution at 10°-15°C.
McIlvaine buffer, pH 3.0-8.0
$Na_2CO_3$—$NaHCO_3$ buffer, pH 9-12
$\mu = 2.4$ As obvious from the above listed results elution at lower than pH 5.0 is difficult and the maximum amount of elution is achieved within the pH range of 7.0-9.0. With amylases extracted from wheat bran and soy beans it was found that the enzymes could be adsorbed safely and eluted at a pH of 5.0-9.0.

The ionic strengths of the elution solutions were determined according to the following procedures. To enzyme solutions with 102 units per ml and pH 3.8 were added 2 percent of kaolinite, adsorbed, washed with water thrice and then the amounts of elution of the enzymes were compared at ionic strengths of 0.27, 0.8, and 2.4 with the use of 20 ml of buffer (pH 4.0-11.0). The results obtained were as follows.

TABLE III. Variations of Elution at Respective Ionic Strengths

| pH of Elution | Elution μ=0.27 | Elution μ=0.8 | Elution μ=2.4 |
|---|---|---|---|
| | Total amount of enzymes eluted, Total Units | | |
| 4.0 | 0 | 0 | 10 |
| 5.0 | 0 | 115 | 14 |
| 6.0 | 10 | 142 | 125 |
| 7.0 | 29 | 207 | 126 |
| 8.0 | 42 | 231 | 204 |
| 9.0 | 125 | 221 | 251 |
| 10.0 | 127 | 211 | 242 |
| 11.0 | 112 | 211 | 144 |

As the above results show elution was not sufficient at ionic strength of 0.27 and the maximum elution rate was attained at the pH 7.0–10.0. The fact that the results corresponded with those of amylases derived from soy beans and wheat bran were also established. Adsorption of the enzymes by adsorbents is generally faster at lower temperature, while elution is faster at higher temperature. However it is preferable that adsorption and elution be carried out at lower than room temperature because of a wider range of pH stability of enzymes resulting at lower temperature.

The methods of adsorption and elution based on the above conditions will be further described.

1. Adsorption and elution of bea-amylases derived from sweet potato.

100 ml of filtered solution extracted from sweet potato was admixed with 0, 0.5, 1, 1.5 and 2 percent (by volume) of adsorbents, stirred at 30°C for 30 minutes, adsorbed and filtered, and the enzymatic activities of the filtrates were determined, designating the loss of activity as the adsorbed enzymatic activities. Elution was carried out with 100 ml of M/5 Na$_2$CO$_3$—NaHCO$_3$ buffer, ionic strength of μ=0.8 standing at 10°–15°C for 20 hours, and then the eluted amounts of enzymes was determined. Since when the enzymes present in enzyme solutions are 100% adsorbed the amount of adsorption per minimum amount of adsorbent exhibits its maximum and the elution rate also displays its maximum, the amounts of enzymatic adsorption and elution, and elution rates obtained by 100 percent adsorption are listed in the following table.

TABLE IV. Adsorption and elution of amylases derived from sweet potato

| Adsorbent | Adsorption: A | B | Elution: C | D | E |
|---|---|---|---|---|---|
| Bentonite | 0 | 7,650 | 0 | | |
| | 0.5 | 0 | 15,300 | 6,990 | 45.7 |
| Acidic clay | 0 | 8,880 | 0 | | |
| | 2 | 1,200 | 3,840 | 2,797 | 72.2 |
| Kaolinite | 0 | 9,170 | 0 | | |
| | 2.5 | 0 | 3,610 | 3,640 | 100 |
| Activated clay | 0 | 6,980 | 0 | | |
| | 1.5 | 110 | 4,580 | 4,763 | 104 |

Notes:
A; The amount of adsorbent added, % (by volume)
B; Enzymes present in filtered solution, U/100 ml
C; The amount of enzymes adsorbed U/gram adsorbent
D; The amount of enzymes eluted, U/gram adsorbent
E; Elution rate, %

Similarly aqueous extract solutions of wheat bran and soy beans extracted at low temperature were filtered, adsorbed and eluted, the results of which are given in the following tables.

TABLE V. Adsorption and elution of wheat bran beta-amylases

| Adsorbent | Adsorption: A | B | Elution C | D | E |
|---|---|---|---|---|---|
| Bentonite | 0 | 8,350 | 0 | | |
| | 8 | 40 | 1,040 | 837 | 80.4 |
| Acidic clay | 0 | 1,760 | 0 | | |
| | 10 | 0 | 176 | 133 | 75.3 |
| Kaolinite | 0 | 1,760 | 0 | | |
| | 8 | 20 | 217 | 196 | 90.5 |
| Activated clay | 0 | 8,350 | 0 | | |
| | 8 | 40 | 1,040 | 980 | 94.1 |

Notes:
A; The amount of adsorbent added, % (by volume)
B; Enzymes present in filtered solution U/100 ml
C; The amount of enzymes adsorbed U/gram adsorbent
D; The amount of enzymes eluted, U/gram adsorbent
E; Elution rate, %

TABLE VI. Adsorption and elution of soy bean beta-amylases

| Adsorbent | Adsorption A | B | Elution: C | D | E |
|---|---|---|---|---|---|
| Bentonite | 0 | 3,990 | 0 | | |
| | 2 | 60 | 1,970 | 596 | 33.5 |
| Acidic clay | 0 | 3,990 | 0 | | |
| | 6 | 33 | 660 | 381 | 57.6 |
| Kaolinite | 0 | 1,950 | 0 | | |
| | 10 | 0 | 1,950 | 1,302 | 66.9 |
| Activated clay | 0 | 3,990 | 0 | | |
| | 6 | 20 | 661 | 242 | 36.1 |

Notes:
A; The The amount of adsorbent added, % (by volume)
B; Enzymes present in filtered solution U/100 ml
C; The amount of enzymes adsorbed U/gram adsorbent
D; The amount of enzymes eluted, U/gram adsorbent
E; Elution rate, %

As the above results show when beta-amylases derived from sweet potato are adsorbed with adsorbents, especially with kaolinite or activated clay, the amount of enzyme adsorbed are several times of that obtained from soy bean or wheat bran beta-amylases and since the amount of elute is 100 percent the process according to the present invention is feasible and advantageous for the industrial purification of enzymes. In the case of soy bean and wheat bran amylases the amount adsorbed is relatively small and displays a slightly lower tendency of elution rate. However, although the amount adsorbed in the case of wheat bran amylases is small the process is applicable on an industrial scale. The results of determinations of the activities (specific activities) per mg nitrogen of the thus obtained enzymes are listed in the following table.

TABLE VII.—COMPARISON OF SPECIFIC ACTIVITIES WITH SWEET POTATO BETA-AMYLASES

| Enzymatic solution | | Mg. nitrogen/ 100 ml. enzyme solution | Beta-amylase/ 100 ml. enzyme solution | Specific activity | Specific activity ratio |
|---|---|---|---|---|---|
| Prior adsorption | | 10.05 | 10$^4$ | 10 | 1 |
| Bentonite | A | 4.30 | 10$^4$ | 23 | 2.3 |
| | B | 1.66 | 4×10$^3$ | 24 | 2.4 |
| Acidic clay | A | 4.28 | 10$^4$ | 23 | 2.3 |
| | B | 2.39 | 7×10$^3$ | 29 | 2.9 |
| Kaolinite | A | 4.37 | 10$^4$ | 23 | 2.3 |
| | B | 1.61 | 10$^4$ | 62 | 6.2 |
| Activated clay | A | 3.93 | 10$^4$ | 26 | 2.6 |
| | B | 2.25 | 10$^4$ | 45 | 4.5 |

Notes.—A, Enzymes adsorbed; B, Enzymes eluted.

As is obvious from the above table the specific activities of enzyme solutions purified by adsorption and elution were increased by two to six times compared with that of the enzyme solution used as the starting material and also the amount of nitrogen impurities were decreased to one sixth. Especially in the case when kaolinite is employed a substantial contribution of the process can be expected, showing an enzymatic yield of nearly 100 percent.

As described in details above, a process suitable for the adsorption and purification of beta-amylases present in wheat malt with using kaolinite has been reported. However, the yield of the process is 50–60 percent, which are not conditions normally used on an industrial scale. On the other hand no detailed information is available on processes for beta-amylases derived from sweet potato or wheat bran. The process investigated by the inventors is applicable for enzymes derived from sweet potato and wheat bran which are sources of relatively pure beta-amylases. The inventors succeeded in the development of a process which is characterized in that the recovery rate of enzymes is nearly 100 percent and that high purity beta-amylases are obtainable with high yields and which comprises the complete adsorption of the enzymes at pH lower than 5.0 using adsorbents, such as kaolinite and activated clay and then completely the enzymes by extraction at a pH greater than 5.0, preferably at a pH range of 7.0–9.0 with water of an ionic strength above 0.5 $\mu$.

THE METHOD OF THE DETERMINATION OF ENZYMATIC ACTIVITIES

A reaction solution comprising 5 ml of 1 percent starch solution, 4 ml of M/10 acetate buffer solution (pH 5.0 ) and 1 ml of enzyme solution is incubated at 40°C for 30 minutes, inactivated with the addition of 2 ml of alkali solution described in the Fehling-Lehmann-Schoorl method, and then with the addition of 2 ml of cupric nitrate the formed reduced sugars are determined quantitatively. The activity of beta-amylase that effected the formation of 10 mg of glucose by a 30 minutes reaction at 40°C from the formed amount of reduced sugars obtained by the subtraction of blanks of substrates and enzymes was disignated as one unit per one ml. The employed enzyme solutions were those diluted in the range in which the formed amounts of reduced sugars were in proportion to the enzymatic activities. Further details of the invention are illustrated by the following examples which represent preferred embodiments. All proportions given are by weight unless otherwise indicated.

EXAMPLE 1

To 4 ml of filtered and washed liquor of rasped sweet potato, which exhibited a beta-amylase activity of 91.7 $\mu$/ml (total activity 3.67 × $10^5$ units), was added 100g of kaolinite and stirred at 30°C for 30 minutes and then filtered. No enzymatic activity was observed in the filtered liquor on determination. To the filter cake was added 300 ml of M/5 $Na_2CO_3$—$NaHCO_3$ buffer (pH 9.0), allowed to standing at 15°C for 16 hours, filtered with suction, and then the filter cake was mixed again with 300 ml of said buffer and filtered with suction. The thus obtained filter cake was suspended again in 100 ml of said buffer and filtered. Enzymatic activity was noticed as being substantially absent in the cake. The enzyme solutions obtained by extracting the filter cakes thrice by the above treatment were put together to give an enzyme solution which was converted into a neutralized solution of one liter with the addition of acetate and then the enzymatic activity was determined, resulting in a total enzymatic activity of 3.45 × $10^5$ units. The recovery rate and specific activity were 94 percent and $\mu$/mg N=62 respectively.

The enzyme solution was added to a liquefied starch solution of sweet potato at the rate of two units per gram starch. The mixture was incubated at pH 6.0 and 45°C for 10 hours and thus a maltose solution which possessed a maltose content of 53 percent was obtained. Further 20 units of isoamlyase were added per gram starch, respectively, and the mixture was incubated at 45°C and pH 5.5 for 40 hours. Thus a yield of a maltose solution with a purity of 93 percent was possible.

EXAMPLE 2

To 100 ml of an aqueous extraction solution of wheat bran (enzymatic activity 350 units per ml) was added 35 mg of activated clay. The mixture was stirred at pH 4.0 at 30°C for 30 minutes, filtered with suction, washed with 50 ml of water twice, 200 ml of a M/5 $Na_2CO_3$-$NaHCO_3$ buffer ($\mu$=0.8) were added, and allowed to stand at 5°–10°C for 20 hours. Following subsequent filtering out of the activated clay the resultant product was extracted again with 100 ml of said buffer, and thus 94% of the enzymatic activity was recovered. Said aqueous extraction solution of wheat bran was treated similarly using kaolinite as the adsorbent. In this case 90 percent of the enzymatic activity was recovered. Since the specific activity of the enzyme was 66 units per mg N, showing an increase of 7–8 times compared with the original solution, and a pure beta-amylase in which no other types of amylases were present was obtained, said enzymes possess a purity which is sufficient for industrial applications.

What we claim is:

1. A process for the purification of beta-amylases comprising treating a crude beta-amylase solution derived from wheat bran, soy bean or fresh sweet potato with an adsorbent selected from the group consisting of bentonite, acidic clay, kaolinite and activated clay with a pH lower than 5.0 to adsorb said beta-amylases, washing the adsorbent enzyme complex with water to remove the impurities therein, and then eluting the adsorbed beta-amylases from the adsorbent-enzyme complex with a solution with an ionic strength over 0.5$\mu$ and a pH exceeding 5.0.

2. A process according to claim 1 wherein said adsorption and elution are carried out at lower than 30°C.

3. A process according to claim 1 wherein said enzymes are adsorbed with an absorbent of the minimum amount that effects 100 percent adsorption of said enzymes on said adsorbent, and in that the elution is carried out following said adsorption.

4. A process according to claim 1 wherein an enzyme solution obtained by the extraction of fresh sweet potato is adsorbed with kaolinite or activated clay to obtain substantially pure enzymes at a higher yield.

5. A process according to claim 1 wherein enzymes derived from wheat bran are recovered at a higher yield using kaolinite or activated clay.

6. A process according to claim 1 wherein enzymes derived from soy bean are recovered at an especially high yield by adsorption with kaolinite and elution.

* * * * *